Sept. 4, 1928.

C. H. HUGHES 1,683,075

AUTOMOBILE SPRING SNUBBER

Filed July 5, 1927

Inventor

Charles H. Hughes.

By A. J. O'Brien

Attorney

Patented Sept. 4, 1928.

1,683,075

UNITED STATES PATENT OFFICE.

CHARLES H. HUGHES, OF DENVER, COLORADO, ASSIGNOR OF ONE-HALF TO H. C. DENNY, OF DENVER, COLORADO.

AUTOMOBILE SPRING SNUBBER.

Application filed July 5, 1927. Serial No. 203,647.

This invention relates to improvements in the construction of snubbers or rebound devices for automobile springs.

It is well known that one of the most annoying features in connection with the spring suspension of automobile bodies is that when the springs rebound after having been severely flexed, they throw the body upwardly at such a great velocity that the momentum carries it up beyond the maximum normal elevation with the result that the springs are flexed in the opposite direction until they bring the body to a stop with a suddenness which throws the occupants upwardly off their seats.

I am aware that many different expedients have been resorted to for the purpose of modifying the rebound action of the springs and that some of them have produced a greatly improved spring action.

It is the object of this invention to produce an improved snubber which shall be of a very simple construction and which will accomplish the result sought in a satisfactory manner.

My invention can be most clearly described and will be most easily understood when reference is had to the accompanying drawing in which the preferred form thereof has been illustrated and in which.

Figure 1:
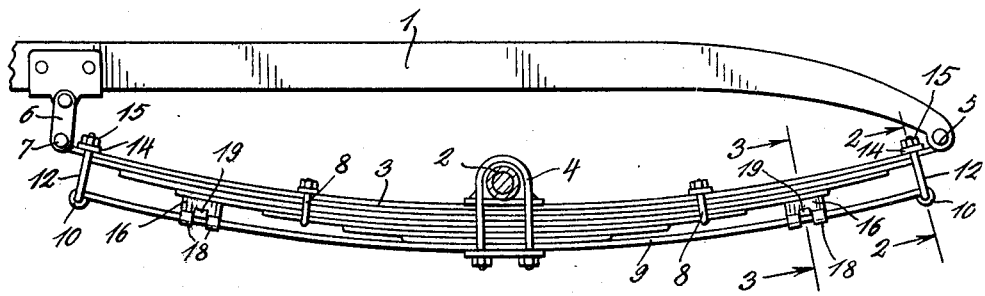
Fig. 1 shows a side elevation of a semielliptical spring constructed in accordance with my invention.
Figure 2:
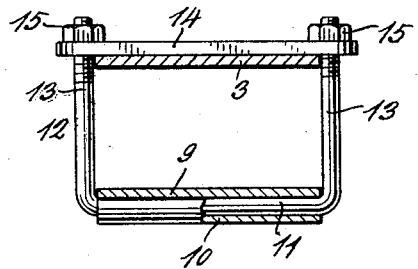
Fig. 2 is a section taken on line 2—2, Fig. 1.

Numeral 1 designates the chassis frame of an automobile and 2 an axle. A semielliptical spring 3 has been shown as attached to the underside of the axle by means of suitable U-bolts 4. One end of the spring 3 is secured to one end of the chassis frame by means of a pivot 5. The other end of the spring is secured to the frame by means of a shackle 6. Spring 3 is of ordinary multiple leaf construction and has been shown as formed from seven leaves of varying length. The longest leaf will be referred to as the "master leaf" and this is provided at each end with an eye; through one of these eyes the bolt 5 extends and through the other of which the bolt 7 extends. A clamp 8 is sometimes provided on each side of the center of the spring to keep the leaves from moving sidewise.

The above described spring and its connection to the axle and to the chassis frame is old and well known. After such a spring has been flexed due to the wheels of the car passing over an elevation, or from any other cause, it will immediately tend to resume its normal shape and will therefore throw the frame 1 upwardly thereby imparting to it a high velocity which gives the moving parts a momentum that tends to carry them upwardly above the normal position. The upward movement is assisted by the spring until it has reached its normal shape and if the movement continues the master leaf will be bent upwardly and will produce a force tending to stop the upward movement of the frame. As the clamps 8 enclose several leaves the master leaf will flex from the clamp 8 to the end only and will therefore bring the upward movement of the frame 1 to a sudden stop which often throws the occupants against the roof of the car.

Figure 3:
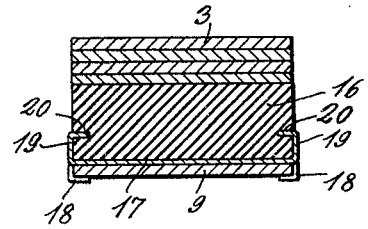
Fig. 3 is a section taken on line 3—3, Fig. 1.

My invention consists in adding a leaf 9 which is clamped to the underside of the spring and rests against the shortest leaf. In the drawing leaf 9 has been shown as extending to both sides of the axle and as terminating near the ends of the spring. It is not necessary, however, to extend the leaf 9 to both sides of the axle as satisfactory results may be obtained by employing leaf 9 in connection with one-half of spring 3 only. The operation will be the same in either case and will now be explained. The ends of leaf 9 are provided with eyelets 10 through which the straight side 11 of the U-bolt 12 extends. The parallel sides 13 of the U-bolt pass through the plate 14 to which they are secured by means of nuts 15. A resilient rubber block 16 is located between the upper surface of the leaf 9 and the underside of spring 3, and has been shown as engaging the underside of the fourth leaf of spring 3. The block 16 has been shown as secured to a plate 17 whose ends have been provided with three fingers 18, 18 and 19. Fingers 19 are bent upwardly and have points 20 that project into the block and fingers 18 are bent about the sides of leaf 9 (Fig. 3) and by this means the block is held in place.

When the spring is bent downwardly, as by a load or on going over a rough place in the road, the leaf 9 offers no appreciable resistance as it is long and flexible. If the spring is subjected to a force that tends to bow it out of normal, as happens on a rebound, the block 16 will engage the underside of spring 3 and form a fulcrum. Since the master leaf is connected to leaf 9 by the U-bolt shackle 12, it is evident that the master leaf cannot bend upwardly without carrying with it the leaf 9. Any upward movement of the outer end or ends of leaf 9 will force the resilient block against the underside of spring 3. The master leaf can therefore bend upwardly only by bending the leaf 9; compressing the block 16 and by bending all of the leaves that lie on top of block 16. When the parts move upwardly on the rebound, therefore, they will be subjected to a gradually increasing force that will bring them to a stop in such a way as to prevent the upward throw which always takes place with the ordinary spring construction.

It is evident that as many resilient blocks 16 may be used as desired, but ordinarily one is sufficient. By making the shackle 12 shorter than shown in the drawing, the block 16 may be made very thin.

Experiments have shown that cars equipped with my simple resilient snubber have their riding qualities greatly improved and that all of the objectionable upward throw has been eliminated.

Applicant desires to call particular attention to the function performed by the resilient rubber block 16. In the first place since this is made of resilient rubber, it prevents noise and in the second place it acts as a resilient cushion and yields slightly when compressed.

Owing to the fact that the auxiliary leaf 9 is spaced some distance from the under surface of the leaf with which the upper surface of block 16 cooperates there will be a sliding motion between the block 16 and the short leaf and as the coefficient of friction between rubber and steel is high, this sliding movement will consume a large amount of energy and produce a snubbing action.

Having thus described my invention what I claim as new is:

1. A vehicle spring of the multiple leaf type comprising an additional leaf secured to the convex side of the spring, the free end of said leaf being connected with the master leaf by a shackle and a resilient block interposed between the upper side of leaf 9 and the underside of the spring, intermediate the ends of said leaf.

2. A vehicle spring of the multiple leaf construction having a master leaf extending the entire length on the concave side and a plurality of shorter leaves on the convex side of the spring, an auxiliary leaf secured to the convex side of the spring, said auxiliary leaf extending substantially to the end of the master leaf and having its end connected with the master leaf by means of a shackle and a block of resilient material interposed between the upper surface of the auxiliary leaf and the underside of the spring, intermediate the ends of said leaf.

In testimony whereof I affix my signature.

CHARLES H. HUGHES.